(12) United States Patent
Johnson et al.

(10) Patent No.: US 7,633,691 B2
(45) Date of Patent: Dec. 15, 2009

(54) OPTICAL MOUNTING FOR HIGH-G ENVIRONMENT

(75) Inventors: Gary H. Johnson, Tucson, AZ (US); John A. Thomas, Tucson, AZ (US); John A. Winkler, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 893 days.

(21) Appl. No.: 10/862,279

(22) Filed: Jun. 7, 2004

(65) Prior Publication Data

US 2005/0270669 A1    Dec. 8, 2005

(51) Int. Cl.
   *G02B 7/02* (2006.01)
(52) U.S. Cl. .................. 359/819; 359/822; 359/815; 359/813
(58) Field of Classification Search ................ 359/819, 359/811, 813, 815, 818, 820, 822, 823; 244/3.1, 244/3.3
   See application file for complete search history.

(56) References Cited

U.S. PATENT DOCUMENTS

| | | | | |
|---|---|---|---|---|
| 3,950,764 A | * | 4/1976 | Hosoe et al. ................. | 396/116 |
| 4,935,916 A | * | 6/1990 | Suzuki et al. ................ | 720/663 |
| 5,249,197 A | * | 9/1993 | Kittell ........................ | 372/107 |
| 5,739,992 A | * | 4/1998 | Horie ........................... | 360/133 |
| 6,307,678 B2 | * | 10/2001 | Kosaka et al. ................ | 359/557 |
| 6,384,510 B1 | * | 5/2002 | Grade et al. ................. | 310/309 |
| 6,657,797 B2 | * | 12/2003 | Menard ....................... | 359/819 |
| 6,871,527 B2 | * | 3/2005 | Hansma et al. ............... | 73/105 |
| 7,193,794 B2 | * | 3/2007 | Beck et al. ................... | 359/822 |
| 7,345,277 B2 | * | 3/2008 | Zhang ......................... | 250/330 |
| 2001/0022688 A1 | * | 9/2001 | Kosaka et al. ............... | 359/557 |
| 2002/0163741 A1 | * | 11/2002 | Shibazaki .................... | 359/819 |
| 2003/0081948 A1 | * | 5/2003 | Nomura et al. ............... | 396/72 |
| 2003/0128491 A1 | * | 7/2003 | Bueno Ruiz et al. ........ | 361/115 |
| 2005/0185241 A1 | * | 8/2005 | Johnson et al. ............. | 359/227 |

* cited by examiner

*Primary Examiner*—Scott J Sugarman
*Assistant Examiner*—Brandi N Thomas
(74) *Attorney, Agent, or Firm*—Renner, Otto, Boisselle & Sklar, LLP

(57) ABSTRACT

An optical element mounting includes a frame, and a shuttle that is translatable relative to the frame. The shuttle includes inner and outer portions that are mechanically coupled together by a plurality of flexures that effectively bending and twisting of the shuttle from being transmitted to an optical element, such as an optical window, that is mounted on the inner portion of the shuttle. The flexures may be thin linking strips of material between the outer and inner portions. The flexures may have a thickness that is greater in an expected load direction, than in a direction perpendicular to the load direction. The optical mounting may include a locking mechanism, for example including a shape memory alloy wire, to lock the shuttle in a predetermined location relative to the frame.

21 Claims, 7 Drawing Sheets

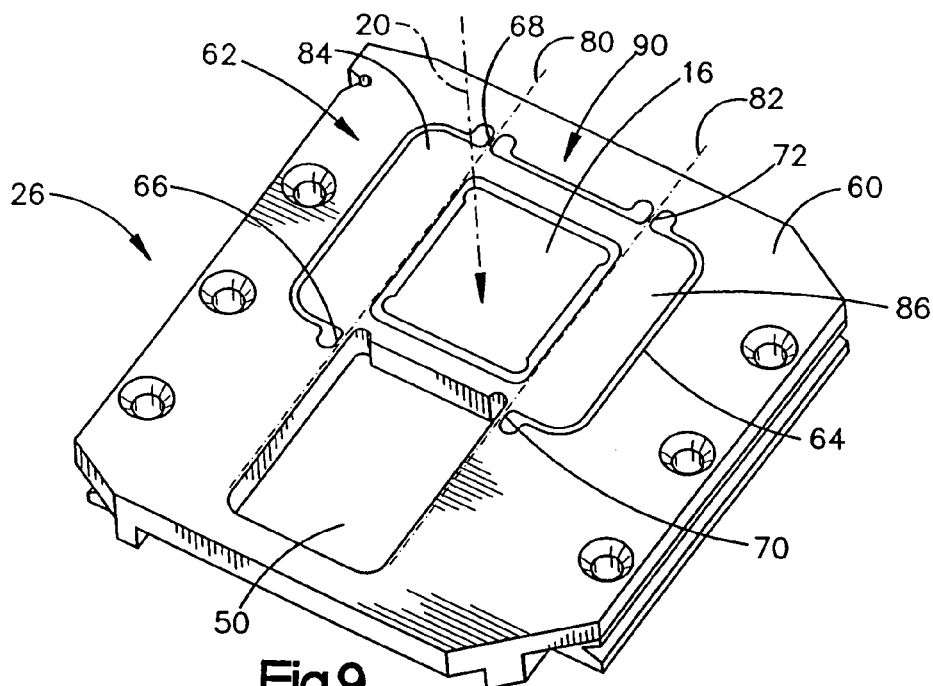
Fig.9
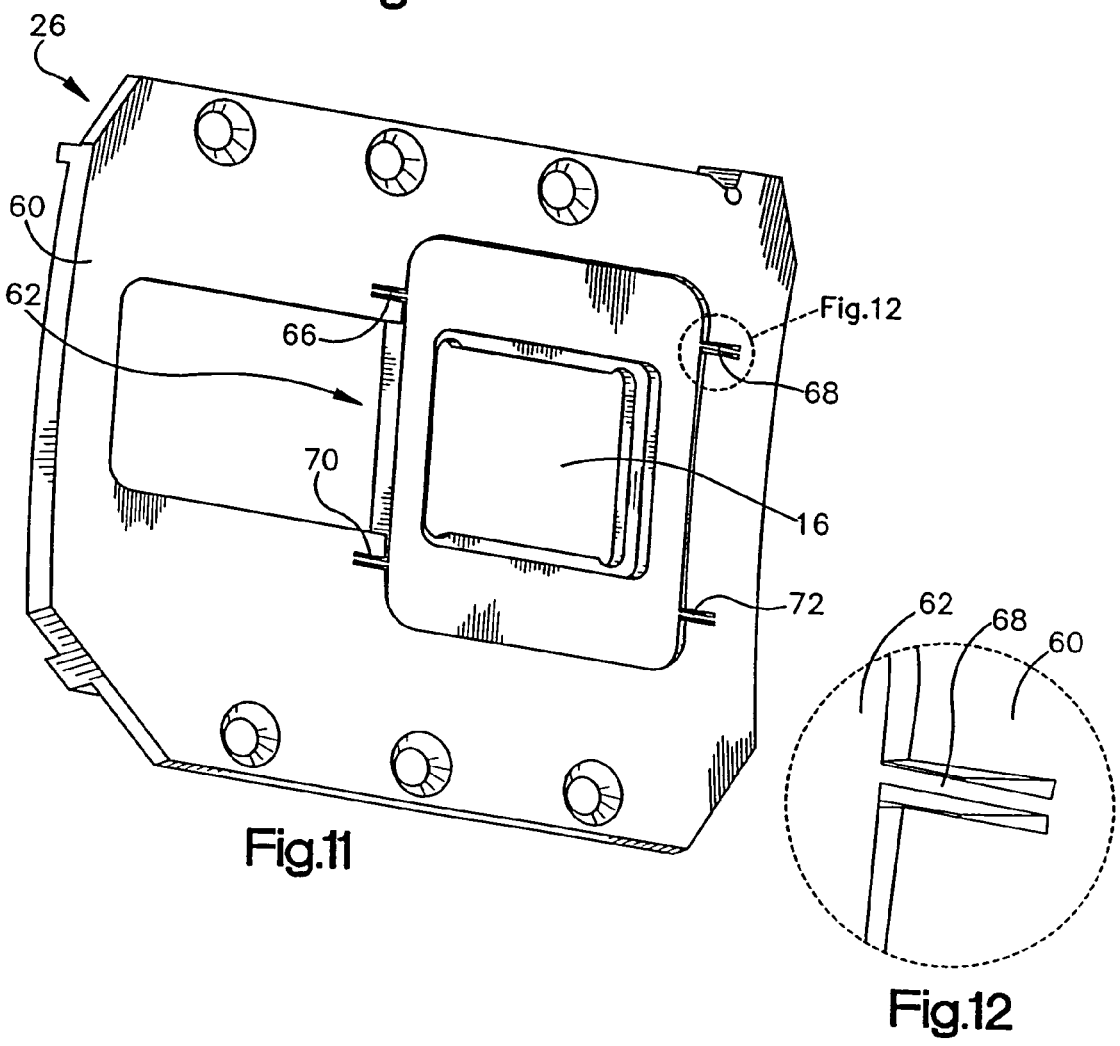
Fig.11
Fig.12

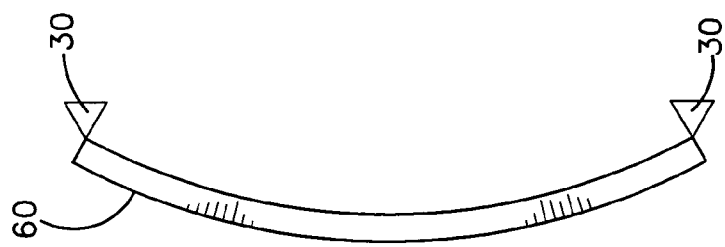
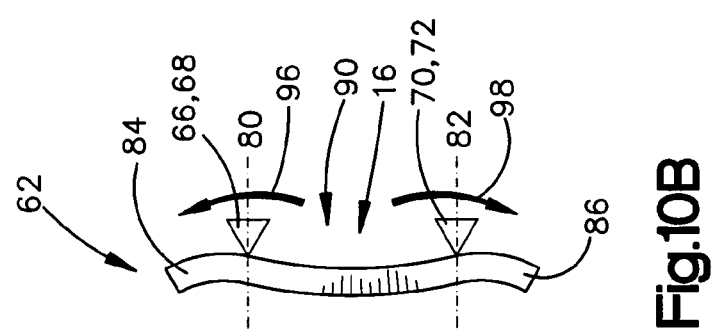
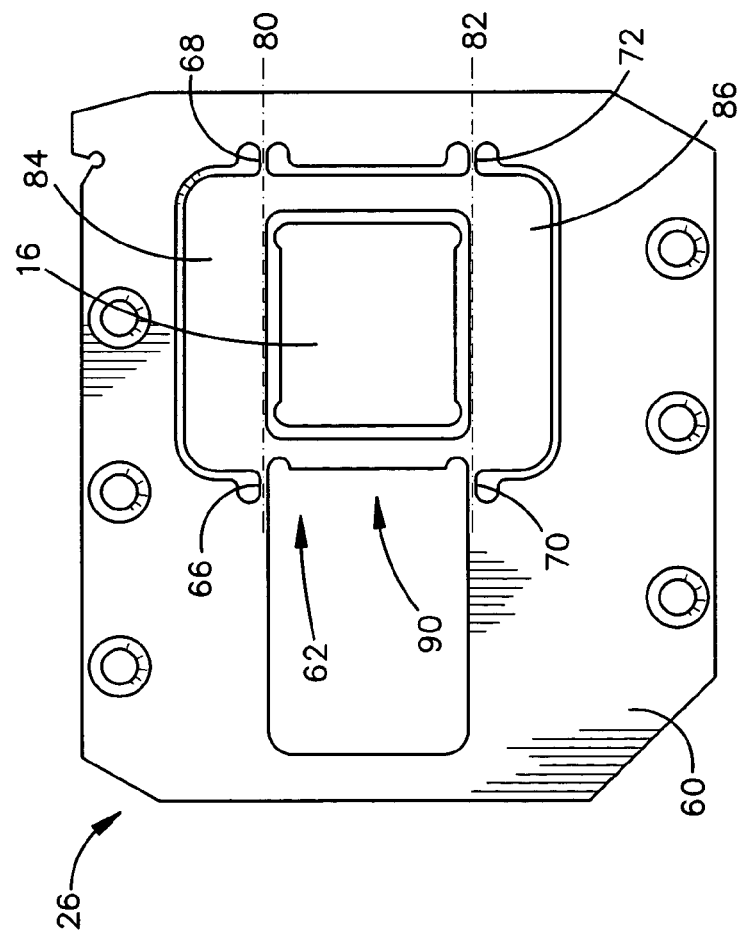

OPTICAL MOUNTING FOR HIGH-G ENVIRONMENT

BACKGROUND OF THE INVENTION

1. Technical Field

The general field of the invention is optical mounting for use in high-mode environments. More specifically, the invention relates to optical mountings for use in high-g environments such as those encountered by missiles or projectiles.

2. Description of Related Art

Guided projectiles may contain relatively brittle optical components that are subjected to high shock loads during launch events, such as in firing the projectile out of a gun. This loading is generally in the axis normal to these components, and causes high stresses that present a challenge to obtain a high probability of survival of the optical component. In addition, it may be desirable to shift certain types of optical components, such as optical windows, before or during flight. An additional constraint may be a limited amount of volume available for optical components.

From the foregoing, it will be appreciated that improvements in optical mounting system will be desirable.

SUMMARY OF THE INVENTION

According to one aspect of the invention, an optical mounting includes a frame; a shuttle movable within the frame; and an optical element within a window in the inner portion. The shuttle includes an outer portion; an inner portion surrounded by the outer portion; and plural flexures mechanically coupling the portions together.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale:

FIG. 9 is an oblique view showing the front of the shuttle, with specific emphasis on the lines of support;

FIGS. 10A-10C are illustrations used in explaining the principles of operation of the shuttle of the optical mounting of FIG. 1 during accelerations normal to the shuttle;

FIG. 11 is an oblique view showing bending of the shuttle during the initial acceleration of launch;

FIG. 12 is a detailed view of a portion of FIG. 11, highlighting the twisting of one of the flexures;

DETAILED DESCRIPTION

An optical element mounting includes a frame, and a shuttle that is translatable relative to the frame. The shuttle includes inner and outer portions that are mechanically coupled together by a plurality of flexures that effectively isolate displacement of the outer portion of the shuttle from being transmitted to an optical element, such as an optical window, that is mounted on the inner portion of the shuttle. The flexures may be thin linking strips of material between the outer and inner portions. The flexures may have a thickness that is greater in an expected load direction, than in a direction perpendicular to the load direction. This may cause the flexures to twist rather than bend, as a load is applied along an axis of a missile or projectile, in a direction substantially perpendicular to the plane of the shuttle. The optical mounting may include a locking mechanism to lock the shuttle in a predetermined location relative to the frame. The locking mechanism may include a latch that is activated and deactivated by selectively applying current to a wire made of a shape memory alloy.

Figure 1:
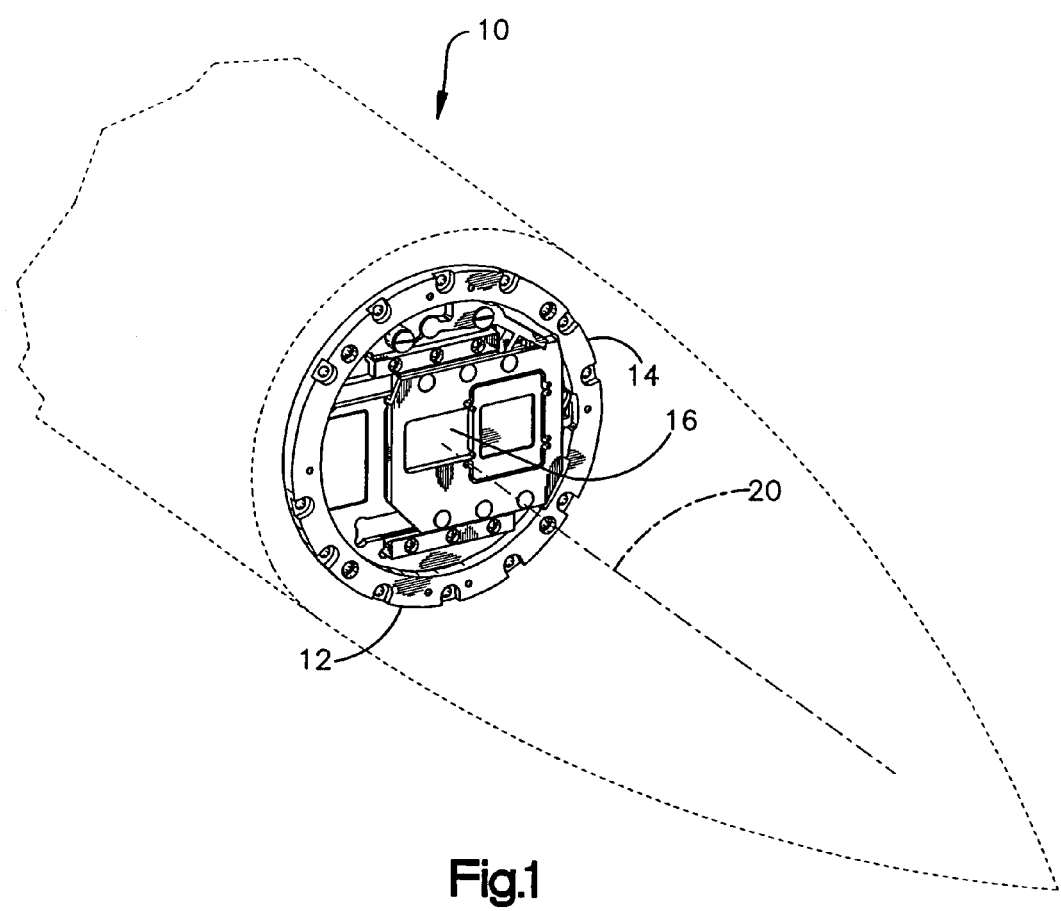
FIG. 1 is an oblique view showing an optical mounting of the present invention installed in a projectile or missile.

Referring initially to FIG. 1, a projectile or missile 10 includes an optical component 12 such as a near infrared (NIR) sensor. The projectile 10 may include an optical mounting 14 for coupling an optical element 16 to the optical component 12. As noted above, one example of an optical element 16 coupled to a NIR sensor 12 is a germanium window that is used in calibrating the NIR sensor 12. The germanium window is moved in place in front of the NIR sensor 12 after launch of the projectile 10, is kept in place during calibration of the NIR sensor 12, and is moved away from the NIR sensor 12 to allow the NIR sensor 12 to operate during flight of the projectile 10. It will be appreciated that strong inertial forces may be felt by the optical component 12 and the optical element 16 in a direction corresponding to the axis 20 of the projectile 10. This may be especially true when the projectile 10 is fired out of a gun or launch tube, either by an explosive or propulsive charge within the tube, or by use of a propulsion system that is part of the projectile or missile 10.

More generally, it will be appreciated that the optic mounting 14 may be more generally utilized for a variety of situations where an optical element 16 or other fragile component is subjected to accelerations or stresses in a particular direction, such as in the axial direction 20, which is substantially perpendicular to a major surface of the optic element 16 or other fragile component. Thus, it will be appreciated that the optic mounting 14 described herein may be used in any of a variety of other situations, requiring control of stresses on a fragile component in an accelerating or other stress-producing environment.

Figure 2:
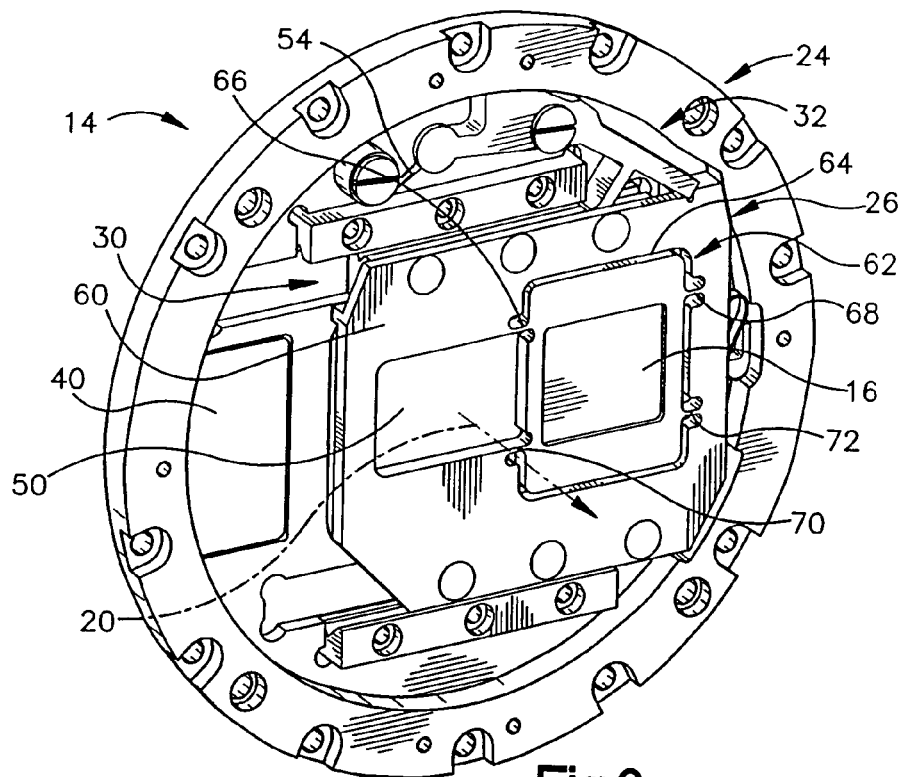
FIG. 2 is an oblique view of an optical mounting in accordance with the present invention.
Figure 3:
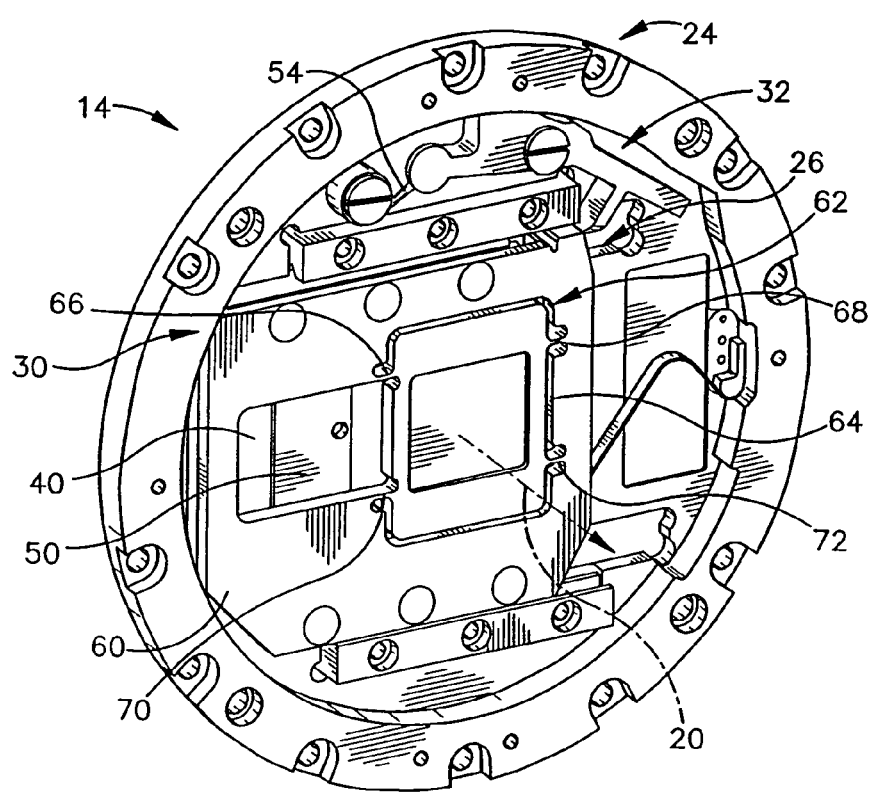
FIG. 3 is an oblique view of another configuration of the optical mounting of FIG. 2, with a shuttle of the mounting translated relative to a frame or housing.

FIGS. 2 and 3 show details of the optical mounting 14. The optic mounting 14 includes a frame or housing 24, and a shuttle 26 that translates along a track relative to the frame or housing 24. The shuttle 26 translates relative to the frame 24 via sets of roller rails 30. The shuttle 26 may be maintained in a first position, shown in FIG. 2, by a latch 32 that engages a detent or notch 34 on the shuttle 26.

Figure 4:
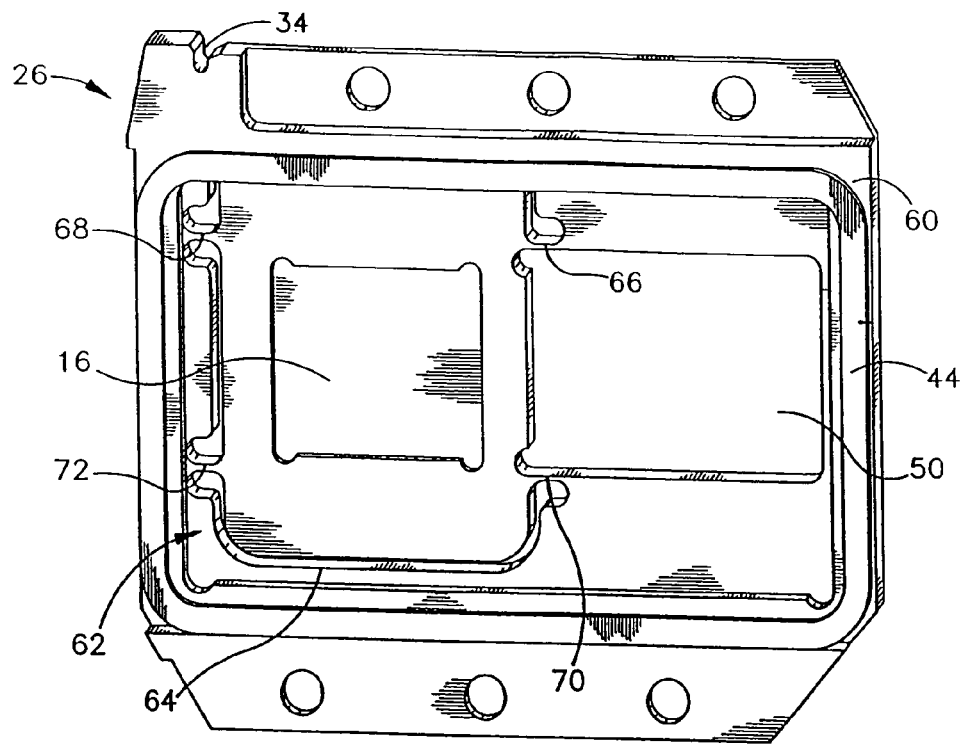
FIG. 4 is a back view of the shuttle of the mounting of FIG. 2.
Figure 5:
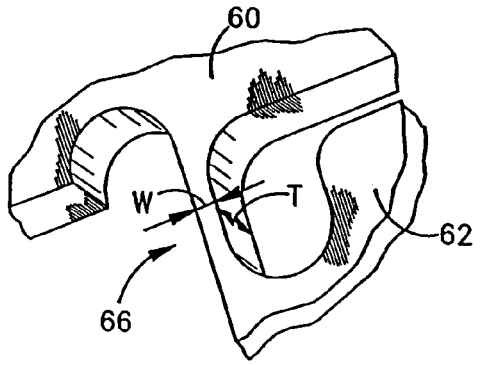
FIGS. 5, 6, 7, and 8 are oblique views of details of the flexures of the optical mounting of FIG. 2.
Figure 6:
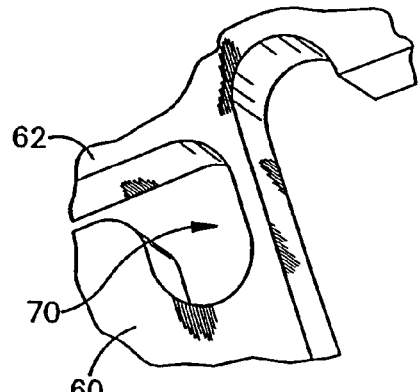
Figure 7:
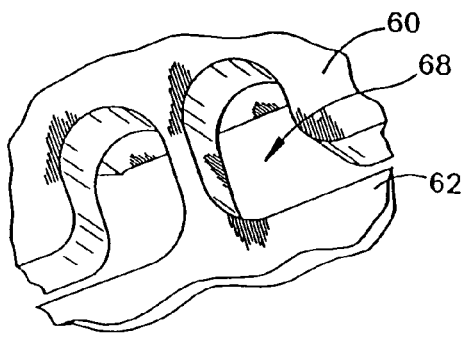
Figure 8:
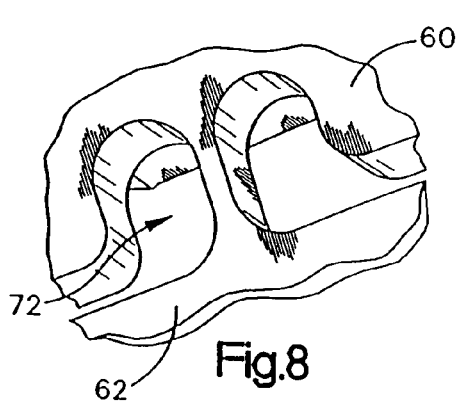

With the latch 32 disengaged from the notch 34, the shuttle 26 is free to move leftward, as shown in FIGS. 2 and 3, to the position illustrated in FIG. 3. A set of magnets 40 may be placed in pockets in the frame or housing 24 to provide a force for this leftward movement of the shuttle 26. As shown in FIG. 4, the shuttle 26 may have a coil 44 on its backside.

Passing current though the coil 44 creates an electrical field that interacts or cooperates with the field of the magnets 40, to urge the shuttle 26 leftward to the position shown in FIG. 3. Reversing the current through the coil 44 may create an electric field that interacts with the field of the magnets 40 to urge the shuttle 26 in an opposite direction, rightward as shown in FIGS. 2 and 3.

Thus, the shuttle 26 may be moved between a position, shown in FIG. 3, where the optical element (germanium window) is centrally located, in front of the NIR sensor or other optical component 12, and a position, shown in FIG. 2, where an opening 50 in the shuttle 26 is centrally located. As noted above, placing the optical element 16 in front of the NIR sensor 12 may allow for calibration of the NIR sensor 12, while placing it in the opening 50 in front of the NIR sensor 12 allows normal operation of the NIR sensor 12.

The magnets 40 may have steel plates bonded to each of their backsides before the magnets 40 are placed in pockets of the frame or housing 24. These bonded steel plates may serve to increase the strength of the magnetic field for each of the magnets 40.

A return spring 54 may provide force to engage the latch 32 into the detent or notch 34 of the shuttle 26. As will be discussed in greater detail below, providing current to a shape memory alloy wire that is coupled to the latch 32 may be used to provide force to disengage the latch 32 from the detent 34.

The shuttle 26 has an outer portion 60 and an inner portion 62. The outer portion 60 may surround the inner portion 62, with a gap 64 between the portions 60 and 62 being interrupted by a series of flexures 66, 68, 70, and 72. The plural flexures 66-72 provide mechanical connection between the portions 60 and 62. In addition, the flexures 66-72 are configured to prevent or reduce excessive transmission of bending stresses from the outer portion 60 to the inner portion 62, and in particular to the optical element 16. Such forces are especially of concern with regard to an axial direction 20 of the missile 10, which is substantially perpendicular to the plane of the optical element 16. The shuttle 26 is substantially planar having major surfaces that are substantially perpendicular to the axial direction 20. As noted above, the optical element 16 may be a suitable window, such as a germanium window, that is adhesively or otherwise coupled to the inner portion 62, such as by placement in a suitable element-receiving opening 76 in the inner portion 62. It will be appreciated that forces in the axial direction 20 will cause stresses within the shuttle 26 in the optical mounting 14. As will be described further below, the flexures 66-72 may be configured and placed so as to reduce the stresses on the optical element 16. This increases survivability of the optical element 16.

With reference now to FIGS. 5-8, detailed views are shown of the flexures 66-72. The flexures 66-72 have a greater thickness T than a width W. Thus, the flexures 66-72 may have a greater stiffness in the direction 20 perpendicular to the shuttle 26, than in a direction 74 within the plane of the shuttle 26. The portions 60 and 62, and the flexures 66-72, may all be parts of a single, continuous, piece of material. The openings 50 and 76, and the gap 64, may be machined in the single, continuous, piece of material.

When the shuttle 26 encounters a force in the direction 20, substantially perpendicular to the shuttle 26, the relative stiffness of the flexures 66-72 in the direction 20 (relative to their stiffness in the perpendicular direction 74) prevents bending of the flexures 66-72 in the axial direction 20. Rather, the flexures 66-72 have a tendency to twist, due to their thin width. Thus, the inner portion 62 may be moved relative to the outer portion 60 within the gap 64, by the action of the twisting of the flexures 66-72. Thus, stresses in the outer portion 60 may be prevented by the flexures 66-72 from being transmitted to the inner portion 62. Rather, the inner portion 62 moves within the gap 64 relative to the outer portion 60, and therefore does not receive stresses caused by deformation of the outer portion 60.

The shuttle 26 may be made of beryllium, or a beryllium alloy, such as an aluminum beryllium alloy. The gap 64 of the shuttle 26 may be machined out of the piece of material of the shuttle 26. The machining may include providing smoothed, curved transitions between the portions 60 and 62, and the flexures 66-72.

The thickness of the shuttle 26, and thus of the flexures 66-72, may be about 1.5 mm (0.06 inches). The width of the flexures 66-72 may be about 0.26 mm (0.01 inches). More broadly, the thickness of the shuttle 26 may be in the range of from about 0.26 mm (0.01 inches) to about 2.6 mm (0.1 inches), although it will be appreciated that other suitable thicknesses may be used.

The flexures 66-72 may have a thickness of at least about 5 times their width. Thus, the flexures 66-72 may have a stiffness in the direction 20 that is at least about 5 times their stiffness in a direction within the plane of the shuttle 26, substantially perpendicular to the direction 20.

With reference now in addition to FIG. 9, the flexures 66-72 may be located with regard to the inner portion 62, so as to reduce stresses on the inner portion 62. The flexures 66-72 may be located on opposite sides of the inner portion 62, along lines of balance or support 80 and 82. The lines of support 80 and 82 are located such that unsupported parts of the inner portion 62 are substantially balanced at the lines 80 and 82, with regard to acceleration in a direction substantially perpendicular to the plane of the inner portion 62, that is, in the axial direction 20.

Toward that end, the inner portion 62 may have counterweight parts 84 and 86 that are outside of the respective lines of balance 80 and 82, and an inboard portion that is inside the lines of balance 80 and 82. The counterweights 84 and 86 may cumulatively have a mass substantially the same as that of the combined mass of the inboard portion 90 and the optical element 16. This balancing of masses reduces the tendency to bend under accelerations substantially perpendicular to the plane of the inner portion 62, thereby reducing bending stresses on the inner portion 62, and particularly upon the optical element 16.

The principles of operation of the shuttle 26 during flexure, induced by acceleration normal to the shuttle, is illustrated in FIGS. 10A, 10B, and 10C. The outer portion 60 of the shuttle 26 flexes as a long span, supported at its edges by the roller rails 30. While the shuttle 26 undergoes some deflection over this long span, the flexures 66-72 are configured to maintain the inboard portion 90 of the inner portion 62 of the shuttle 26 flat. The flexures 66-72 provide support points for the inner portion 62. As the outer portion 60 bows or bends along the long span between the roller rails 30, the flexures 66-72 twist, as indicated by the arrows 96 and 98. This twisting of the flexures 66-72, along with the distribution of the mass of the inner portion 62, being balanced along the balance lines 80 and 82, helps keep the inboard portion 90 and the optical element 16 relatively flat. Thus bowing or bending of the outer portion 60 of the shuttle 26 is not transferred to the optical element 16.

Figure 13:
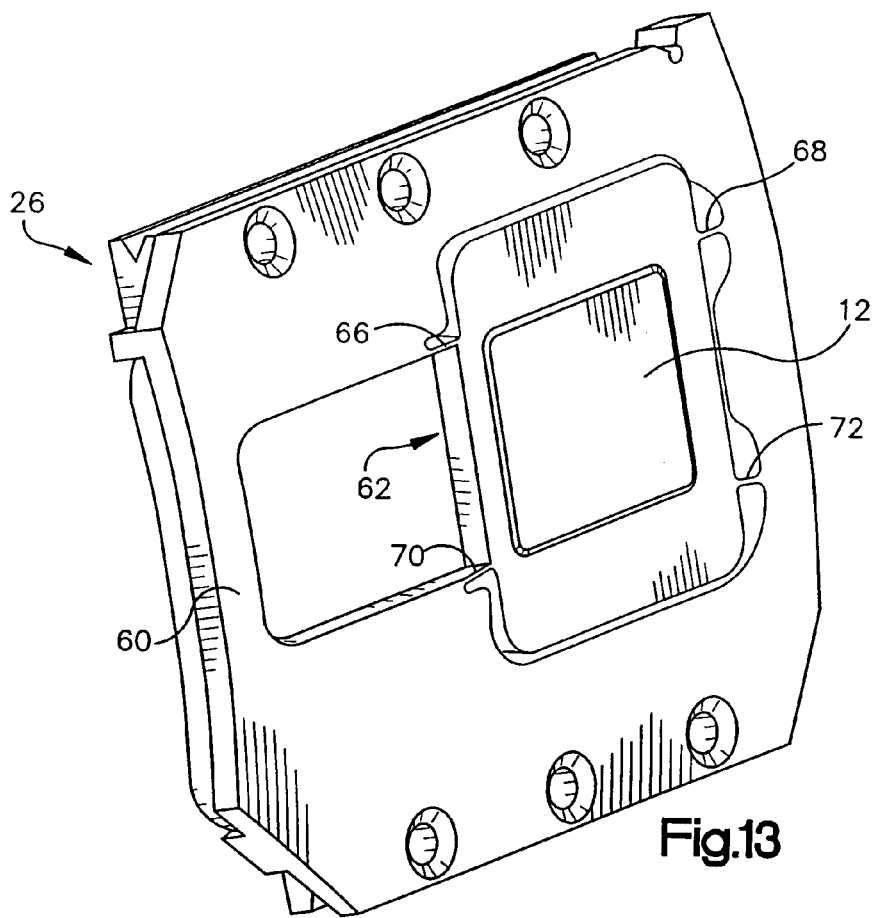
FIG. 13 is an oblique view showing bending of the shuttle during recoil from the initial acceleration of launch.

FIGS. 11-13 show the bending of the shuttle 26 during a launch process. As shown in FIG. 11, upon the rapid acceleration at the beginning of the launch, the outer portion 60 of the shuttle 26 bows, while the flexures 66-72 twist outward (from the center of the shuttle) to help maintain the optical element 16 flat. This twisting is shown in greater detail in FIG. 12, which provides a close-up view of the twisting of the flexure 68.

Turning now to FIG. 13, during launch recoil the outer portion 60 of the shuttle 26 bends in an opposite direction.

The flexures 66-72 twist inward to aid in maintaining the optical element 16 relatively flat.

Thus by selectively placing the flexures 66-72 and the counterweights 84 and 86, stresses on the optical element 16 may be kept low, approaching their theoretical low limit achieved by mounting the component in an infinitely rigid mount. The flexures 66-72, to at least some degree, isolate the optical component 16 from bending stresses imposed upon the outer portion 60 of the shuttle 26. The combination of balanced weights about the lines of support 80 and 82, and the isolation due to the flexures 66-72 helps maintain an environment for the optical element 16 with low stresses.

Figure 14:
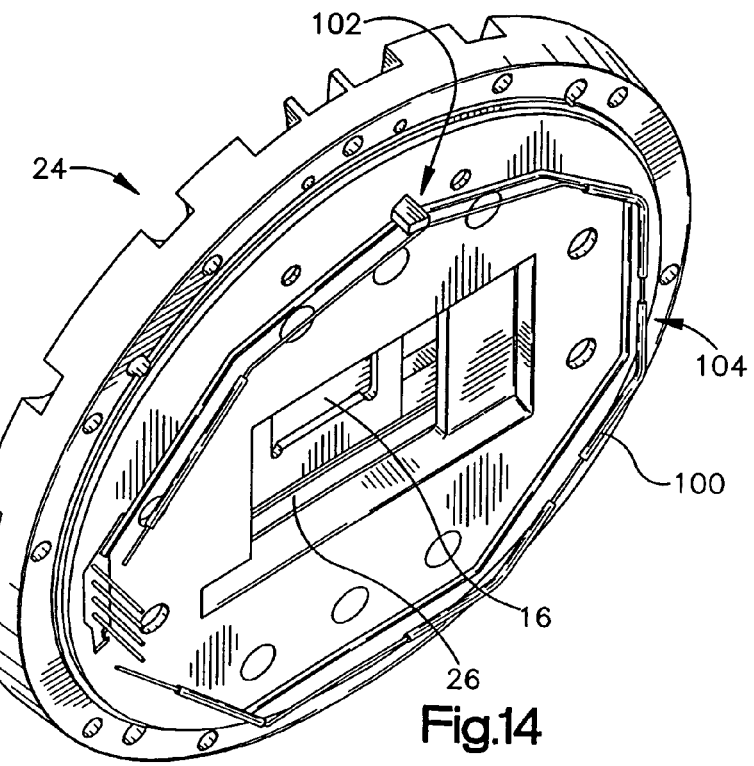
FIG. 14 is another oblique view of the optical mounting of FIG. 2, showing details on the back sides of the optical mounting.
Figure 15:
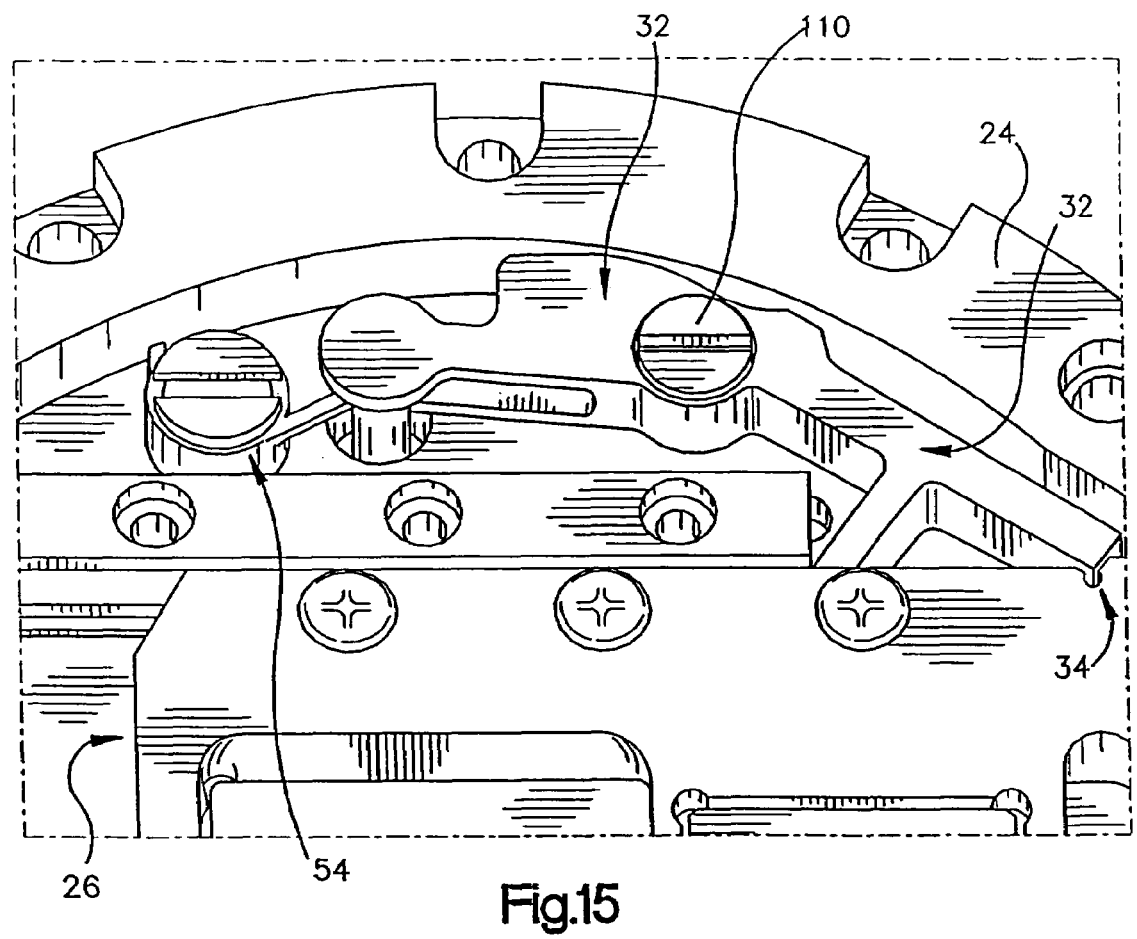
FIG. 15 is a detailed view showing components of the latching mechanism of the optical mounting of FIG. 2.

Referring now in addition to FIGS. 14 and 15, details are given of the engagement and disengagement of the latch 32. As mentioned above, the return spring 54 is used to ensure that the latch 32 remains seated in the detent or notch 34 in the shuttle 26. In order to disengage the latch 32 from the detent 34, a shape memory alloy wire 100 is utilized. The shape memory alloy wire 100 is looped through an eyelet 102 in the latch 32, and is routed through a guide channel 104 machined into the back of the housing or frame 24. The shape memory alloy wire 100 is operatively coupled to a current source. When current is passed through the shape memory alloy wire 100, the shape memory alloy 100 heats up due to electrical resistance, and contracts, due to a metallurgical crystal structure transformation caused by the heating. This contraction in the length of the shape memory alloy wire causes the latch 32 to rotate about a pivot point 110, disengaging the latch 32 from the detent 34.

With the latch 32 unseated and the shuttle coil 44 energized, the shuttle 26 may translate leftward in FIGS. 2 and 3, so as to place the optical element 16 in the optical path of the NIR sensor 12. Once current is removed from the shape memory alloy wire 100, the shape memory alloy wire 100 quickly cools. The force of the return spring 54 is used to rotate the latch 32 about the mounting pivot or pivot point 110, stretching the cooled wire 100. This urges the latch 32 against the shuttle 26, and allows the latch 32 to engage the detent 34. Reversing current in the coil 44 (FIG. 4) causes the shuttle 26 to move rightward as shown in FIGS. 2 and 3, allowing the latch 32 to engage the detent 34, once the return spring 54 rotates the latch 32 to the seated position.

The shape memory alloy wire 100 may be a suitable titanium nickel alloy. Suitable alloy wires are available from many suppliers, such as Dynalloy, Inc.

The same current source may be used for providing current to both the shape memory alloy 100 and the coil 44. It will be appreciated however, that different current sources may be provided for these different components.

The above-described optical mounting provides a convenient, low weight, and compact way of preserving and moving optical components in a high stress environment. The flexures and the overall layout of the shuttle provides a way of preventing high stresses from reaching an optical window, and the latching mechanism provides a fast-acting way of securing the shuttle within the frame or housing. A coil and magnet scheme provides a fast acting way of translating the shuttle.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical mounting comprising:
   a frame;
   a shuttle movable within the frame, wherein the shuttle includes:
      an outer portion;
      an inner portion surrounded by the outer portion; and
      plural flexures mechanically coupling the portions together; and
   an optical element within an opening in the inner portion.

2. The mounting of claim 1, wherein the portions and the flexures are made from a single piece of material.

3. The mounting of claim 2, wherein the material includes beryllium or a beryllium alloy.

4. The mounting of claim 3, wherein the material includes an aluminum-beryllium alloy.

5. The mounting of claim 2, wherein the material has a thickness from about 0.01 inches to about 0.1 inches.

6. The mounting of claim 2, wherein the material has machined gaps between the inner portion and the outer portion.

7. An optical mounting comprising:
   a frame;
   a shuttle movable within the frame, wherein the shuttle includes;
      an outer portion;
      an inner portion surrounded by the outer portion; and
      plural flexures mechanically coupling the portions together; and
   an optical element within an opening in the inner portion;
   wherein the inner portion is substantially planar, and the flexures are located relative to the inner portion such that unsupported portions of the inner portion are substantially balanced with regard to accelerations in a direction substantially perpendicular to a plane of the inner portion.

8. The mounting of claim 7,
   wherein the inner portion includes counterweights further than the flexures from a center of the inner portion; and
   wherein the counterweights substantially balance the optical element and parts of the inner portion that are closer than the flexures to the center of the inner portion.

9. The mounting of claim 1, wherein the flexures include two pairs of flexures.

10. The mounting of claim 1, wherein the flexures twist in response to forces on the inner portion that are substantially perpendicular to a major surface of the inner portion.

11. The mounting of claim 1, wherein the optical element includes a germanium window.

12. The mounting of claim 11, wherein the optical mounting is coupled to an NIR sensor.

13. The mounting of claim 1, wherein the frame includes a latch for securing the shuttle in a given position relative to the frame.

14. The mounting of claim 13, wherein the latch is configured to engage a detent in the shuttle.

15. The mounting of claim 13, wherein the frame includes a shape memory alloy wire coupled to the latch for disengaging the latch.

16. The mounting of claim 15, wherein heating the shape memory alloy wire changes length of the wire, which in turn causes rotation of the latch about a pivot.

17. The mounting of claim 15, wherein the shape memory alloy wire is routed through a guide channel in the frame.

18. An optical mounting comprising:
a frame;
a shuttle movable within the frame, wherein the shuffle includes;
an outer portion;
an inner portion surrounded by the outer portion; and
plural flexures mechanically coupling the portions together; and
an optical element within an opening in the inner portion;
wherein the frame has at least one magnet therein; and
wherein the shuttle has a coil configured to have a current passed therethrough, so as to cooperate with the at least one magnet, to produce a force tending to move the shuttle relative to the frame.

19. The mounting of claim 1, wherein the shuttle is translatable as a unit within the frame.

20. The mounting of claim 19, further comprising a set of roller rails between the shuffle and the frame that allow the shuttle to translate within the frame.

21. The mounting of claim 1, wherein the flexures have a greater stiffness in a direction perpendicular to the shuttle, than in a direction within a plane of the shuttle.

* * * * *

UNITED STATES PATENT AND TRADEMARK OFFICE
CERTIFICATE OF CORRECTION

PATENT NO. : 7,633,691 B2  Page 1 of 1
APPLICATION NO. : 10/862279
DATED : December 15, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Ninth Day of November, 2010

David J. Kappos
*Director of the United States Patent and Trademark Office*